United States Patent
Lin et al.

(10) Patent No.: US 12,328,751 B1
(45) Date of Patent: Jun. 10, 2025

(54) RADIO RESOURCE MANAGEMENT OF WLAN AND INTERFERENCE THRESHOLD DETERMINATION FOR RADIO RESOURCE MANAGEMENT OF WLAN

(71) Applicant: TP-Link Systems Inc., Irvine, CA (US)

(72) Inventors: Xia-Na Lin, Shenzhen (CN); Bin He, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/808,125

(22) Filed: Aug. 19, 2024

(51) Int. Cl.
 *H04W 72/541* (2023.01)
 *H04W 72/0457* (2023.01)
 *H04W 88/08* (2009.01)

(52) U.S. Cl.
 CPC ..... *H04W 72/541* (2023.01); *H04W 72/0457* (2023.01); *H04W 88/08* (2013.01)

(58) Field of Classification Search
 CPC ........... H04W 72/541; H04W 72/0457; H04W 88/08
 USPC ......................................................... 370/329
 See application file for complete search history.

(56) References Cited

U.S. PATENT DOCUMENTS

| 2015/0201421 | A1* | 7/2015 | Park | H04J 11/0056 455/452.1 |
| 2016/0150526 | A1* | 5/2016 | Koudouridis | H04W 28/16 370/329 |
| 2017/0164402 | A1* | 6/2017 | Zhang | H04W 72/542 |
| 2023/0319580 | A1* | 10/2023 | Cong | H04W 72/541 370/329 |

FOREIGN PATENT DOCUMENTS

| CN | 106658551 A | 5/2017 |
| CN | 116015583 A | 4/2023 |
| CN | 114268999 B | 11/2023 |

* cited by examiner

Primary Examiner — Chi Tang P Cheng
(74) Attorney, Agent, or Firm — Loeb & Loeb LLP

(57) ABSTRACT

Radio resource management of WLAN and interference threshold determination for radio resource management are provided. The method may include: acquiring interference data of the multiple APs; calculating respective original interference degrees of the multiple APs based on the interference data; and adjusting radio resources of the multiple APs in a descending order of the respective original interference degrees of the multiple APs, including: obtaining a current interference degree of a current AP to be adjusted, wherein the current interference degree is calculated based on the interference data adjusted according to current radio resources of the multiple APs, and reducing the current radio resource of the current AP to be adjusted in the case that the current interference degree of the current AP to be adjusted is larger than an interference threshold. The interference threshold may be predetermined such that network qualities of multiple predetermined different WLAN topology scenarios increase.

15 Claims, 4 Drawing Sheets

RADIO RESOURCE MANAGEMENT OF WLAN AND INTERFERENCE THRESHOLD DETERMINATION FOR RADIO RESOURCE MANAGEMENT OF WLAN

TECHNICAL FIELD

The present disclosure generally relates to wireless communication, and more specifically, to radio resource management of a wireless local area network (WLAN) with multiple access points (APs) and determination of an interference threshold for the radio resource management of the WLAN.

BACKGROUND

With the growth of wireless communication users, the development of wireless communication services is facing the problems of resource shortage and low efficiency of communication. Therefore, the wireless local area network (WLAN) puts forward the option of increasing high-frequency wireless channels and introducing ultra-large bandwidth. During the discussion of the protocol of the Institute of Electrical and Electronics Engineers (IEEE) 802.11be, some 320 MHz bandwidth channels are introduced on the 6G high-frequency channel. In some dense scenarios, due to the network coverage overlapping among APs expanding, the mutual interference among APs in the WLAN is also increasing, and the growth of resource benefit brought by the increase of radio resources may not offset the decline of interference benefit. Thus, it may be needed for wireless products to intelligently avoid interference and optimize network qualities by dynamically assigning appropriate radio resources such as frequency bands or bandwidths for APs in the WLAN in real time according to the current wireless environment.

SUMMARY

In view of the above technical problems, the present disclosure provides techniques for radio resource management of a WLAN with multiple access points (APs) and techniques for determining an interference threshold for the radio resource management of a WLAN.

According to one embodiment of the present disclosure, there is provided a method for radio resource management of a wireless local area network (WLAN) with multiple access points (APs), comprising: acquiring interference data of the multiple APs; calculating respective original interference degrees of the multiple APs based on the interference data; and adjusting radio resources of the multiple APs in a descending order of the respective original interference degrees of the multiple APs, comprising: step (1): obtaining a current interference degree of a current AP to be adjusted, wherein the current interference degree is calculated based on the interference data adjusted according to current radio resources of the multiple APs, step (2): reducing the current radio resource of the current AP to be adjusted in the case that the current interference degree of the current AP to be adjusted is larger than an interference threshold, and repeating step (1) and step (2) until the current interference degree of every AP is not larger than the interference threshold.

According to another embodiment of the present disclosure, there is provided a method for determining an interference threshold for radio resource management of a wireless local area network (WLAN) with multiple different WLAN topology scenarios, comprising: acquiring interference data of multiple access points (APs) in each of the multiple different WLAN topology scenarios; adjusting radio resources of the multiple APs in each of the multiple different WLAN topology scenarios based on the interference data and each of multiple interference threshold candidates; determining a network quality of each of the multiple different WLAN topology scenarios adjusted based on each of the multiple interference threshold candidates; and determining the interference threshold according to network qualities of all the multiple different WLAN topology scenarios adjusted based on all the multiple interference threshold candidates.

According to yet another embodiment of the present disclosure, there is provided a controller for radio resource management of a wireless local area network (WLAN) with multiple access points (APs), comprising one or more processors; a memory coupled to at least one of the processors; and a set of computer program instructions stored in the memory, which, when executed by at least one of the processors, perform actions of: acquiring interference data of the multiple APs; calculating respective original interference degrees of the multiple APs based on the interference data; and adjusting radio resources of the multiple APs in a descending order of the respective original interference degrees of the multiple APs, comprising: step (1): obtaining a current interference degree of a current AP to be adjusted, wherein the current interference degree is calculated based on the interference data adjusted according to current radio resources of the multiple APs, step (2): reducing the current radio resource of the current AP to be adjusted in the case that the current interference degree of the current AP to be adjusted is larger than an interference threshold, and repeating step (1) and step (2) until the current interference degree of every AP is not larger than the interference threshold.

According to yet another embodiment of the present disclosure, there is provided a controller for determining an interference threshold for radio resource management of a wireless local area network (WLAN) with multiple different WLAN topology scenarios, comprising: one or more processors; a memory coupled to at least one of the processors; and a set of computer program instructions stored in the memory, which, when executed by at least one of the processors, perform actions of: acquiring interference data of multiple access points (APs) in each of the multiple different WLAN topology scenarios; adjusting radio resources of the multiple APs in each of the multiple different WLAN topology scenarios based on the interference data and each of multiple interference threshold candidates; determining a network quality of each of the multiple different WLAN topology scenarios adjusted based on each of the multiple interference threshold candidates; and determining the interference threshold according to network qualities of all the multiple different WLAN topology scenarios adjusted based on all the multiple interference threshold candidates.

According to one embodiment of the present disclosure, there is provided a computer program product for radio resource management of a wireless local area network (WLAN) with multiple access points (APs), comprising a set of computer program instructions, which, when executed by at least one processor, perform actions of: acquiring interference data of the multiple APs; calculating respective original interference degrees of the multiple APs based on the interference data; and adjusting radio resources of the multiple APs in a descending order of the respective original interference degrees of the multiple APs, comprising: step (1): obtaining a current interference degree of a current AP to be adjusted, wherein the current interference degree is calculated based on the interference data adjusted according to current radio resources of the multiple APs, step (2): reducing the current radio resource of the current AP to be adjusted in the case that the current interference degree of the current AP to be adjusted is larger than an interference threshold, and repeating step (1) and step (2) until the current interference degree of every AP is not larger than the interference threshold.

According to yet another embodiment of the present disclosure, there is provided a computer program product for determining an interference threshold for radio resource management of a wireless local area network (WLAN) with multiple different WLAN topology scenarios, the computer program product comprising a set of computer program instructions, which, when executed by at least one processor, perform actions of: acquiring interference data of multiple access points (APs) in each of the multiple different WLAN topology scenarios; adjusting radio resources of the multiple APs in each of the multiple different WLAN topology scenarios based on the interference data and each of multiple interference threshold candidates; determining a network quality of each of the multiple different WLAN topology scenarios adjusted based on each of the multiple interference threshold candidates; and determining the interference threshold according to network qualities of all the multiple different WLAN topology scenarios adjusted based on all the multiple interference threshold candidates.

According to yet another embodiment of the present disclosure, there is provided a non-transitory computer-readable storage medium for radio resource management of a wireless local area network (WLAN) with multiple access points (APs), storing instructions that cause a processor to: acquire interference data of the multiple APs; calculate respective original interference degrees of the multiple APs based on the interference data; and adjust radio resources of the multiple APs in a descending order of the respective original interference degrees of the multiple APs, comprising: step (1): obtaining a current interference degree of a current AP to be adjusted, wherein the current interference degree is calculated based on the interference data adjusted according to current radio resources of the multiple APs, step (2): reducing the current radio resource of the current AP to be adjusted in the case that the current interference degree of the current AP to be adjusted is larger than an interference threshold, and repeating step (1) and step (2) until the current interference degree of every AP is not larger than the interference threshold.

According to yet another embodiment of the present disclosure, there is provided a non-transitory computer-readable storage medium for determining an interference threshold for radio resource management of a wireless local area network (WLAN) with multiple different WLAN topology scenarios, storing instructions that cause a processor to: acquire interference data of multiple access points (APs) in each of the multiple different WLAN topology scenarios; adjust radio resources of the multiple APs in each of the multiple different WLAN topology scenarios based on the interference data and each of multiple interference threshold candidates; determine a network quality of each of the multiple different WLAN topology scenarios adjusted based on each of the multiple interference threshold candidates; and determine the interference threshold according to network qualities of all the multiple different WLAN topology scenarios adjusted based on all the multiple interference threshold candidates.

At least based on the above embodiments of the present disclosure, an improved mechanism for radio resource management of a WLAN with multiple access points (APs) can be realized. Further, a mechanism for determining the interference threshold for the radio resource management of the WLAN based on multiple WLAN topology scenarios is raised. With such an interference threshold, the network qualities in most scenarios after the radio resource management may be improved without presenting negative effects.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements.

DETAILED DESCRIPTION

Figure 1:
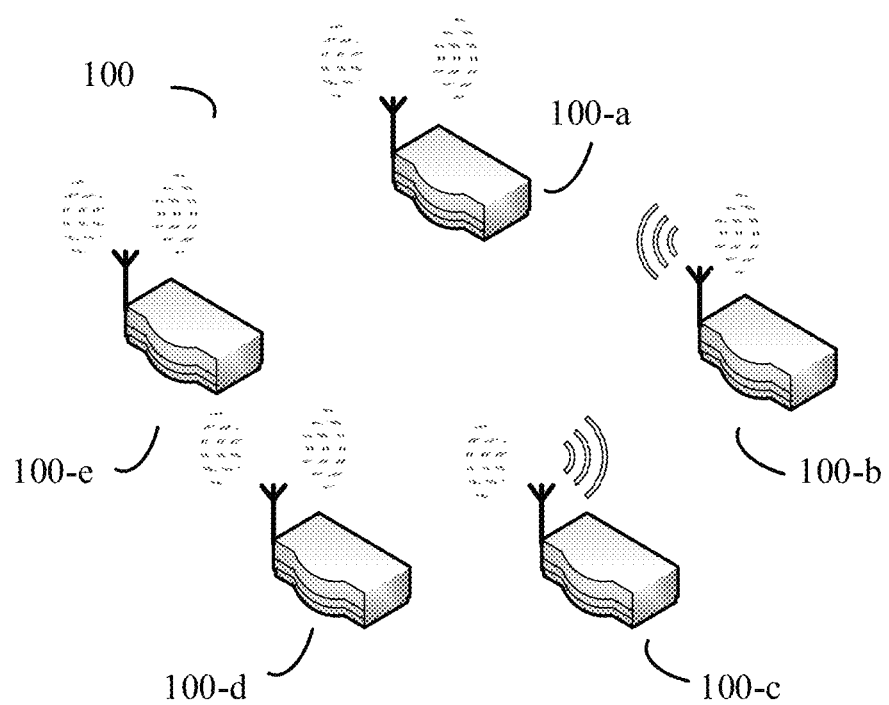
FIG. 1 shows an exemplary WLAN topology scenario with multiple access points (APs) according to an embodiment of the present disclosure.

The technical solutions of the present disclosure will be clearly and completely described below in conjunction with accompanying drawings. The described embodiments are part of the embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, whereas cannot be understood as indicating or implying relative importance. Likewise, words like "a", "an" or "the" do not represent a quantity limit, but represent the existence of at least one. Words like "include" or "comprise"

mean that an element or an object in front of the said word encompasses those ones listed following the said word and their equivalents, without excluding other elements or objects. Words like "connect" or "link" are not limited to physical or mechanical connections, but may include electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the specific meanings of the above terms in the present disclosure may be understood on a case-by-case basis.

In addition, technical features involved in different embodiments of the present disclosure described below may be combined with each other as long as no conflicts occur therebetween.

In the present disclosure, an AP, which may be interchangeably referred to as a wireless access point (WAP), is a communication device that can communicate with a terminal (e.g., a station (STA) or client device) in a WLAN and that allows the terminal to connect to a wired network. The AP usually connects to a router (via a wired network) as a standalone device, but it can also be integrated with or employed in the router.

Likewise, in the present disclosure, a terminal (e.g., a client device or station, which is interchangeably referred to as an STA) is a communication device that can communicate with an AP to obtain various communication services such as voice, video, packet data, messaging, broadcast, etc. The STA can be any device that contains an IEEE 802.11-conformant media access control (MAC) and physical layer (PHY) interface to the wireless medium (WM). For example, an STA may be a laptop, a desktop personal computer (PC), a personal digital assistant (PDA), an access point, or a Wi-Fi phone in a WLAN environment. The STA may be fixed or mobile. In the WLAN environment, the terms "STA", "client device", "wireless client", "user" and "user device" are often used interchangeably.

In the present disclosure, an STA in a WLAN may work as an AP on a different occasion, and vice versa. This is because communication devices in the context of IEEE 802.11 (Wi-Fi) technologies may include both STA hardware components and AP hardware components. In this manner, the communication devices may switch between an STA mode and an AP mode, based on actual WLAN conditions and/or requirements. In various embodiments below, a non-AP STA may refer to an STA in a WLAN that is not implemented as an AP.

As used herein, the term "communicating" or "communication" may relate to wireless communication (e.g., transmission and/or reception of data and/or control channels) on one or more operational bands.

The present disclosure will be described in detail below with reference to exemplary embodiments thereof. However, the present disclosure is not limited to the embodiments described herein, and it can be implemented in many different forms. The described embodiments are only used to make this disclosure thorough and complete, and fully convey the concept of this disclosure to those skilled in the art. Features of the described embodiments may be combined or substituted with each other unless explicitly excluded or should be excluded according to the context. The listing below should be considered as examples to explain general concepts. These items should not be interpreted in a narrow way. Furthermore, these items can be combined in any manner Radio resource management including bandwidth selection and/or band deployment may be achieved by using the coverage overlap ratio between APs or sorting with regional traffic. In the method of using the coverage overlap ratio between APs, the required signal strength attenuation model may be obtained through theoretical analysis or scene measurement, scanned signal strengths may be obtained by controlling the APs in the network to scan each other, then the signal strength can be taken into the attenuation model to calculate the coverage range of each AP, and finally, the coverage overlap ratio between APs may be calculated to determine whether to adjust the radio resources, for example, reducing the bandwidth or turning off one or more APs. This method may be limited by the calculation accuracy of its attenuation model. As to adjusting the radio resources according to the regional traffic, the scheme may count the traffic of each AP in the network and then allocate radio resources to the AP according to the required traffic. If a certain region is currently a high-traffic region, it will be allocated more radio resources to meet the demand.

Due to the time-varying and complexity of the wireless environment, the attenuation model may hardly summarize most WLAN topology scenarios, which leads to the inaccurate calculation of the attenuation model in some scenarios, so the calculated AP coverage overlap ratio may also be inaccurate. In addition, only considering the coverage ratios of APs, it may be difficult to distinguish the differences between actual wireless environments, for example, it may be difficult to distinguish the interference of surrounding APs from the background noise. Under different environmental parameters, the optimal coverage ratio for adjusting radio resources may not be adjusted adaptively. For the method of adjusting the radio resources according to the regional traffic, when multiple high-traffic APs are in the same dense area, almost all of them run using the maximum radio resources, which may lead to too strong and serious mutual interferences with each other to achieve optimization of the network quality. Thus, this technology may not achieve radio resource management with both environmental universality and maximization of network quality.

In view of the above, in order to solve one or more of the above problems, the present disclosure proposes an effective and dynamic radio resource management method. The radio resource management in the present disclosure includes bandwidth selection such as reducing the bandwidth to an appropriate bandwidth, and/or band deployment such as turning off an AP. According to embodiments of the present disclosure, the radio resource of an AP in a WLAN may be adjusted by comparing an interference degree of the AP with an interference threshold. The interference degree may be calculated based on interference data obtained for the AP. In addition, the interference threshold may be determined considering various WLAN topology scenarios such that the network qualities of those WLAN topology scenarios may increase by applying the interference threshold. According to embodiments of the present disclosure, the radio resources of a WLAN may be effectively and dynamically arranged to ensure good network performance of the WLAN. In addition, with the appropriate interference threshold selected under multiple WLAN topology scenarios, the positive effect of performance for most of the multiple WLAN topology scenarios may be ensured.

FIG. 1 shows an exemplary WLAN topology scenario with multiple access points (APs) according to an embodiment of the present disclosure. The illustrative architecture consisting of five APs 100-a, 100-b, 100-c, 100-d, and 100-e is referred to as WLAN 100 herein. The five APs are interconnected to form WLAN 100 to provide net access services to client devices. As previously stated, WLAN 100 permits a client device to access a variety of communication services from the internet, including voice, video, packet data, messaging, and broadcast, among others.

The exemplary network scenario presented in FIG. 1 is illustrative and does not impose any limitations on any embodiment of this disclosure. Different kinds of WLAN topology scenarios may be deployed, which may refer to different numbers of APs in a WLAN and/or different distances between APs in a WLAN. The number of APs and/or the distances between APs in a WLAN may be determined depending on the application requirements and/or the capabilities of the APs. The number of APs is not limited by the exemplary network scenario presented in FIG. 1 and may be set greater or less than the five APs depicted.

Figure 2:
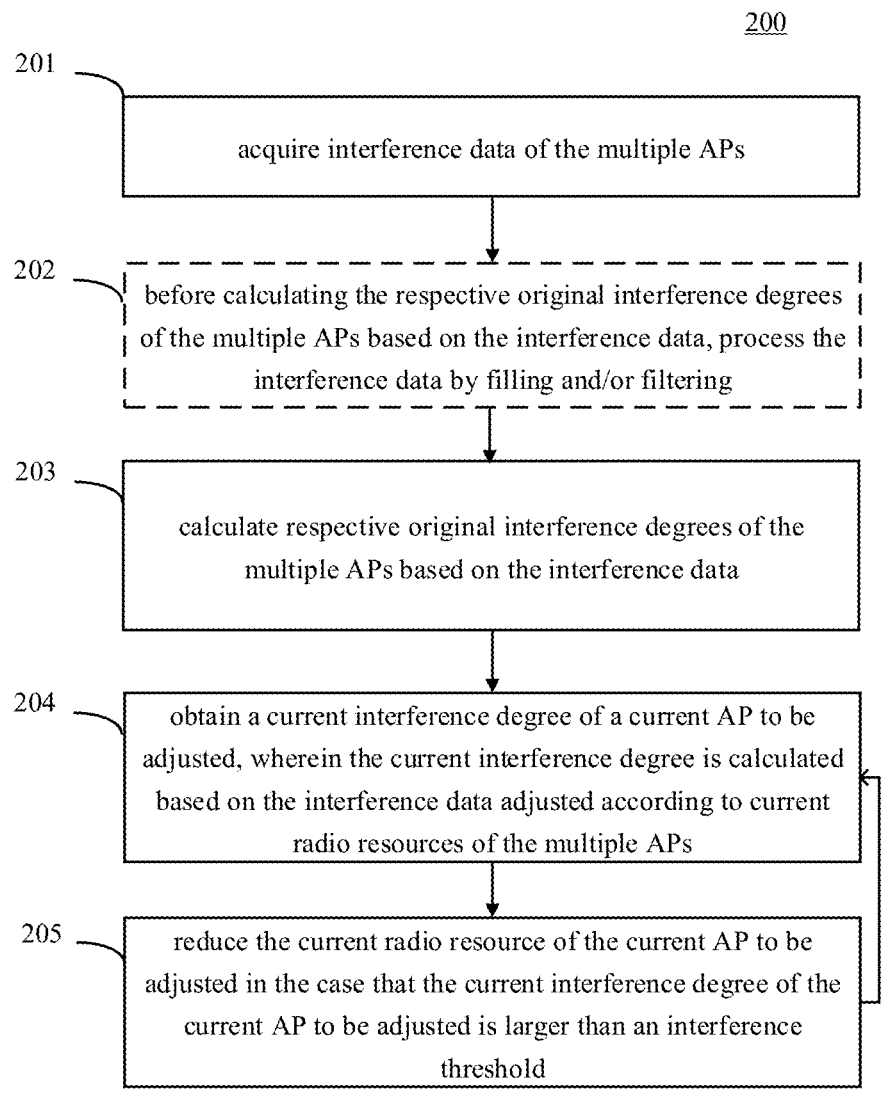
FIG. 2 shows a flowchart of a method for radio resource management of a WLAN with multiple access points (APs) according to an embodiment of the present disclosure.

FIG. 2 shows a flowchart of a method for radio resource management of a WLAN with multiple access points (APs) according to an embodiment of the present disclosure. Method 200 may be applied to a WLAN such as WLAN 100 shown in FIG. 1 and may be implemented by a controller deployed in the WLAN. The controller may be an independent computing device separated from the APs or be incorporated within any one or more of the APs in the WLAN. Method 200 may contain steps 201-205 as follows.

According to one embodiment of the present disclosure, at Step 201, the controller may acquire interference data of the multiple APs. The interference data may include various data related to the interference to the multiple APs. The interference may comprise a first interference part from APs within the WLAN, a second interference part from APs outside the WLAN and/or a third interference part from non-AP interference sources. The third interference part may also be referred to as environmental interference. Taking WLAN 100 in FIG. 1 as an example, the controller may acquire interference data respectively for APs 100-a to 100-e. For instance, for AP 100-a, the controller may acquire data related to interference from the other APs 100-b to 100-e within WLAN 100 as the first interference part, acquire the data related to interference from other APs in neighboring WLANs to WLAN 100 as the second interference part, and acquire the data related to interference from non-AP interference sources as the third interference part.

The first interference part from APs within the WLAN may be scanning information from APs within the WLAN, such as received signal strength indication (RSSI) between the multiple APs, etc. The second interference part from APs outside the WLAN may be scanning information from APs outside the WLAN, such as RSSI, channel and bandwidth. The third interference part from non-AP interference sources may be scanning information from non-AP sources in the environment such as noise level, channel utilization rate, etc.

The above interference data may be obtained by channel scanning. The method of channel scanning may comprise, for instance, the following procedure. The AP that needs channel scanning may switch to the channel to be scanned, stay for some time such as several milliseconds, scan the channel, and then switch back to the previous operating channel. The AP may switch to the next channel to be scanned again after several seconds, and repeat the above scanning procedures.

In particular, channel scanning may be implemented by monitoring the messages of the channel from the neighboring APs or by actively sending the Probe Request frame and then monitoring the Probe Response frame from the neighboring APs. In such a way, the interference data can be acquired through channel scanning. Optionally, in order to prevent the scanned data from missing and shaking, the above scanning procedures may be performed multiple times, such as three times. Further, in order to prevent all APs in the WLAN from switching at the same time, the time for APs to switch the channel to be scanned may be added with random disturbance.

At Step 203, the controller may calculate respective original interference degrees of the multiple APs based on the interference data. The interference degree indicates the degree of an AP suffering interferences. The larger the degree is, the more interferences the AP suffers. The interference degree may be calculated based on the above interference data. For example, in the case that the interference data is RSSI, the interference degree may be the RSSI or any value proportional to the RSSI.

In some embodiments, the interference data may comprise the first interference part, the second interference part and the third interference part, and the first interference part, the second interference part and the third interference part may be assigned different weights when calculating the interference degree. In such a way, different interferences may contribute to the interference degree differently, which may be more aligned with the real situation and make the interference degree more sensible.

For example, the interference degree of $AP_i$ of the multiple APs in a WLAN may be calculated in the following way.

First, a first degree part with respect to the first interference part may be calculated. The first degree part of $AP_i$ may be positively correlated with the scanned RSSIs by APs in the WLAN. For example, the interference degree $f_{in}^i$ of $AP_i$ incurred by $AP_j$ within the WLAN is positively correlated with (for example, proportional to) the scanned $RSSI_{i,j}$, that is, $f_{in}^i \propto RSSI_{i,j}$, wherein $RSSI_{i,j}$ denotes the scanned RSSI of $AP_i$ by $AP_j$ within the WLAN. Then, the first degree part of $AP_i$ may be calculated by summing the interference degrees $f_{in}^i$ of $AP_i$ incurred by all other APs within the WLAN.

Second, a second degree part with respect to the second interference part may be calculated. The second degree part of $AP_i$ may be positively correlated with the scanned RSSIs by APs outside the WLAN. For example, the interference degree $f_{ext}^i$ of $AP_i$ incurred by $AP_k$ outside the WLAN is positively correlated with (for example, proportional to) the scanned $RSSI_{i,k}$, that is, $f_{ext}^i \propto RSSI_{i,k}$, wherein $RSSI_{i,k}$ denotes the scanned RSSI of $AP_i$ by $AP_k$ outside the WLAN. Then, the second degree part of $AP_i$ may be calculated by summing the interference degrees $f_{ext}^i$ of $AP_i$ incurred by all APs that can be scanned outside the WLAN.

Third, a third degree part with respect to the third interference part may be calculated. The third degree part of $AP_i$ may be positively correlated with the environmental scanning data. The environmental scanning data may include parameters such as Noise Floor and/or Channel Load, which represent wireless noise and/or channel utilization rate. Each of those parameters may be multiplied by a weight value assigned as demand. The wireless noise refers to the noise interfered by non-WLAN on the channel, and the channel utilization rate refers to the percentage of the channel usage in time given the total channel measuring time in the process of information or packets transmission. Such wireless noise and channel utilization rate may be abnormally high due to the large interference caused by the non-WLAN environment, and thus the scanning data like wireless noise and channel utilization rate can represent the degree of the interference. For example, when the wireless noise from the non-WLAN environment scanned by the $AP_i$ is high, it means that there may be many interferences of other signals in the current environment. For another example, when the channel utilization rate from the non-WLAN environment scanned by the $AP_i$ is high, it means that there may be many interferences of other signals in the current environment. The third degree part $f_{noise}$ may be calculated by $f_{noise} \propto$ [channelLoad$_{ch}$, noiseFloor$_{ch}$, . . . ], where channelLoad$_{ch}$ is the channel load which denotes the percentage of the channel usage in time in view of the total channel measuring time, representing channel utilization rate, and noiseFloor$_{ch}$ is the noise floor of the current channel which denotes the sum of noise signals, representing wireless noise. The channelLoad$_{ch}$ and noiseFloor$_{ch}$ may be multiplied with a weight assigned as demand. Please note that both or either of the channelLoad$_{ch}$ and noiseFloor$_{ch}$ may be used, and any other parameters that can represent the environment noises may also be used.

Fourth, the above three calculated interference parts may be combined as the interference degree of $AP_i$. For example, the above three calculated interference parts may be directly summed. Alternatively, the above three calculated interference parts may be summed with different weights to adapt to different requirements. The weights may be determined according to experiences or by experiments.

It should be noted that the above interference information related to the RSSI of the APs is only provided as illustrative but not limiting examples. The present disclosure does not restrict the type of interference data and the way of processing such data. Other types of data representing interference may be used, as long as the data can be used to indicate one AP interfered with other APs within the WLAN or outside the WLAN or the environment.

The controller may adjust radio resources of the multiple APs in a descending order of the respective original interference degrees of the multiple APs by performing steps 204-205 repeatedly until the respective interference degree of every AP in the WLAN is not larger than a predetermined interference threshold.

Taking FIG. 1 as an example, assuming the calculated respective original interference degrees of APs 100-a to 100-e are in the order that the original interference degree of AP 100-a is larger than that of AP 100-b, which is larger than that of AP 100-c, which is larger than that of AP 100-d, which is larger than that of AP 100-e, then the radio resources of APs 100-a to 100-e will be adjusted in the order of AP 100-a, AP 100-b, AP 100-c, AP 100-d and AP 100-e. In such a way, the radio resource of an AP with larger interference will be adjusted earlier, and thus the adjustment will be more efficient and effective.

At Step 204, the controller may obtain a current interference degree of a current AP to be adjusted, wherein the current interference degree is calculated based on the interference data adjusted according to current radio resources of the multiple APs, for example, the current bands or bandwidths of the APs. The current interference degree of a current AP to be adjusted is the interference degree for the network radio resource configuration when adjusting the current AP. It may be the same as the above calculated original interference degree if the network radio resource configuration is not changed, or different from the above calculated original interference degree if the network radio resource configuration is changed after adjusting the radio resources. When the network radio resource configuration is changed, the current interference degree will be calculated based on the changed network radio resource configuration, that is, based on the interference data adjusted according to the current radio resources of the multiple APs.

For example, when the radio resource (such as bandwidth or band) adjustment process starts, AP 100-a is the current AP to be adjusted, and the current network radio resource configuration is the same as that for calculating the original interference degree, that is, the radio resource of no AP has been adjusted. Therefore, the current interference degree of AP 100-a is the same as the original interference degree of AP 100-a. Then, when AP 100-b becomes the current AP to be adjusted, the current interference degree of AP 100-b may be different from its original interference degree since the current network radio resource configuration may be changed because the radio resource of AP 100-a may have been reduced. If the radio resource of AP 100-a has been reduced, the interference to AP 100-b may be changed. Therefore, the interference data used to calculate the current interference degree of AP 100-b should be adjusted according to the current radio resources of the APs. In particular, the interference incurred by the removed radio resource of AP 100-a to AP 100-b should be removed from the interference data. Then, the current interference degree for AP 100-b may be calculated based on the adjusted interference data, which reflects the interference on AP 100-b with the current network radio resource configuration. The methodology for calculating the current interference degree can be the same as that for the original interference degree as described above.

At Step 205, the controller may reduce the current radio resource of the current AP to be adjusted in the case that the current interference degree of the current AP to be adjusted is larger than an interference threshold. As described at Step 204, the current interference degree of the current AP to be adjusted may be obtained based on the current network radio resource configuration. Then, the radio resource of the current AP may be adjusted based on the current interference degree. Specifically, if the current interference degree of the current AP is larger than an interference threshold, the radio resource of the current AP may be reduced, for example, by half, such as from 160 MHz to 80 MHz. Otherwise, the radio resource of the current AP will not be changed. The interference threshold may be predetermined based on experiences or experiments, which will be described later.

Step 204 and Step 205 may be repeated for every AP in the WLAN in the above-mentioned order until the interference degree of every AP in the WLAN is not larger than the interference threshold. For example, steps 204 and 205 may start from AP 100-a as mentioned above. After the radio resource of AP 100-a is reduced, steps 204 and 205 are performed for AP 100-b, AP 100-c, and so on until the interference degree of no AP 100-b to 100-e in the WLAN is larger than the interference threshold. In an embodiment, if the radio resource of a previous AP needs not to be adjusted, the radio resources of the following APs will be directly determined not to be adjusted without performing steps 204 and 205 since the interference degrees of the following APs are larger than that of the previous AP, which means the interference degree of the most severely interfered AP meets the interference threshold, and thus the remaining APs certainly meet the threshold.

Optionally, before calculating the respective original interference degrees of the multiple APs based on the interference data, the controller may process the interference data by filling and/or filtering, as shown at Step 202, In some scenarios, there may be time-varying and complexity of the wireless environment in a WLAN, and the scanning information may contain missing parts or fluctuation, so it may be valuable to take some data preprocessing methods, such as copying data from another AP having the missing data, or filtering the data. In particular, as an example, in the case of missing parts of scanning data, the missing pieces may be filled by copying from other APs with relatively complete scanning data, or the missing pieces may be filled through filtering such as mean filtering, etc. In the case of large fluctuation of scanning data, scanning data may be processed through filtering such as Kalman filtering or mean filtering. For example, it is possible to obtain multiple interference data values for the same interference source, and the values may have certain fluctuations due to the instability of the wireless environment, so a preprocessing step like filtering may be used to remedy the deficiencies of the acquired raw data.

In an embodiment, adjusting the radio resources of the multiple APs may comprise turning off one or more of the multiple APs. In this embodiment, if the current interference degree of the current AP to be adjusted is larger than the interference threshold, the current AP will be turned off. In other words, the radio resource such as band of the current AP will be reduced to zero. This embodiment is also referred to as the band deployment.

According to another embodiment, adjusting the radio resources of the multiple APs may comprise reducing the bandwidths of one or more of the multiple APs step by step. In this embodiment, if the current interference degree of the current AP to be adjusted is larger than the interference threshold, the bandwidth of the current AP will be reduced by a step, and then the procedure will move to the next AP to be adjusted in the descending order. For example, if the current interference degree of AP 100-a is larger than the interference threshold, the bandwidth of AP 100-a will be reduced by a step, for example, from 160 MHz to 80 MHz. Then, the procedure of bandwidth reduction moves to AP 100-b, AP 100-c, AP 100-d, and AP 100-e in turn. After the process for AP 100-e is finished, the procedure moves back to AP 100-a for another round. The current interference degree of AP 100-a is calculated again, and if it is still larger than the interference threshold, the bandwidth of AP 100-a will be reduced by another step, for example, from 80 MHz to 40 MHz. In such a way, the procedure may be performed until the interference degree of no AP 100-b to 100-e in the WLAN is larger than the interference threshold.

In an embodiment, the interference threshold may change according to the current bandwidth of the current AP to be adjusted. For example, when the bandwidth of the current AP operates at 160 MHz, the interference threshold may be a first value, and when the bandwidth of the current AP operates at 80 MHz, the interference threshold may be a second value. The first value may be different from the second value. In other words, the threshold for changing from 160 MHz to 80 MHz may be different from the threshold for changing from 80 MHz to 40 MHz. According to this embodiment, the interference threshold may be more flexible and adapted to the network condition, resulting in better performance.

The interference threshold may be predetermined based on experiences or experiments. In an embodiment, the interference threshold may be predetermined such that network qualities of multiple predetermined different WLAN topology scenarios increase after adjusting the radio resources of multiple APs in each of the multiple predetermined different WLAN topology scenarios with the interference threshold. In such a way, the determined interference threshold can be universally used in multiple WLAN topology scenarios, especially those mostly used ones, to improve the performance of the WLAN topology scenarios. The methodology for adjusting radio resources of the APs in prior art mostly considers only one network topology scenario, which may not be suitable for different network topology scenarios and thus may not effectively improve the performance of different topology scenarios. The WLAN topology scenario may refer to the number of APs and the distance between the APs in the WLAN. Embodiments of the method for determining the interference threshold will be illustrated in the FIG. 3 hereinafter.

Generally, multiple different WLAN topology scenarios may be deployed with different numbers of APs and/or different distances between the APs. For example, one WLAN in a WLAN topology scenario may be set up with 40 APs and a distance of 60 meters between the APs, while another WLAN in another WLAN topology scenario may be set up with 30 APs and a distance of 60 meters between the APs. For another example, one WLAN in a WLAN topology scenario may be set up with 40 APs and a distance of 60 meters between the APs, while another WLAN in another WLAN topology scenario may be set up with 40 APs and a distance of 70 meters between the APs. Please note that the WLAN topology scenarios are not limited to the above examples. For instance, in a topology scenario, not all the distances between the APs in the scenario are the same.

For each WLAN topology scenario, the radio resources of the APs in the WLAN topology scenario may be adjusted based on multiple interference threshold candidates, and the network qualities of the WLAN topology scenario adjusted based on the multiple interference threshold candidates may be determined. After all the multiple different WLAN topology scenarios are adjusted with respect to all the multiple interference threshold candidates and all the corresponding network qualities are determined, the interference threshold may be determined according to the network qualities of all the multiple different WLAN topology scenarios adjusted based on all the multiple interference threshold candidates, for example, such that the network qualities of multiple predetermined different WLAN topology scenarios out of the multiple different WLAN topology scenarios increase after adjusting the radio resources of the multiple APs of the multiple predetermined different WLAN topology scenarios with the interference threshold. In other words, the determined interference threshold may be suitable to improve the performance of multiple WLAN topology scenarios. According to an embodiment of the present disclosure, the methodology for adjusting the radio resources of the APs in each WLAN topology scenario based on each of the multiple interference threshold candidates may be the same as that described with respect to FIG. 2.

Figure 3:
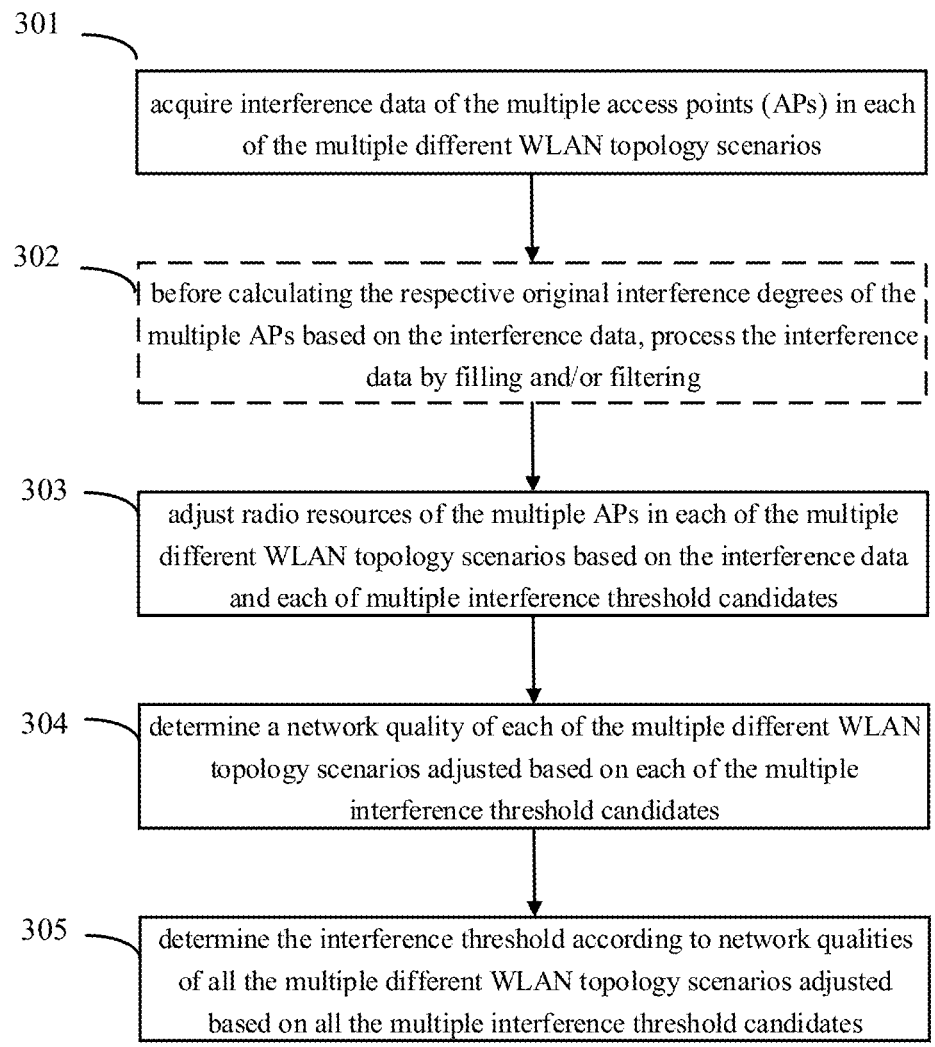
FIG. 3 shows a flowchart of a method for determining an interference threshold for radio resource management of a WLAN with multiple different WLAN topology scenarios according to an embodiment of the present disclosure.

FIG. 3 shows a flowchart of a method for determining an interference threshold for radio resource management of a WLAN with multiple different WLAN topology scenarios according to an embodiment of the present disclosure. Method 300 may contain steps 301-305 as follows, which may be implemented by a controller with a computing unit.

At Step 301, the controller may acquire interference data of the multiple access points (APs) in each of the multiple different WLAN topology scenarios. Step 301 is similar to Step 201, and the descriptions with respect to Step 201 also applies to Step 301.

At Step 303, the controller may adjust radio resources of the multiple APs in each of the multiple different WLAN topology scenarios based on the interference data and each of multiple interference threshold candidates. For example, the radio resources of the multiple APs in each of the multiple different WLAN topology scenarios may be adjusted in a descending order of interference degrees of the multiple APs, which are calculated based on the interference data of the multiple APs. In an embodiment, the procedures of adjusting radio resources of the multiple APs in each of the multiple different WLAN topology scenarios based on each of the multiple interference threshold candidates may comprise steps similar to steps 204-205 illustrated in FIG. 2. The above description with respect to steps 204-205 also applies here.

For example, adjusting the radio resources (such as bandwidth or band) of the multiple APs in each of the multiple different WLAN topology scenarios based on the interference data and each of multiple interference threshold candidates may comprise:

a) calculating respective original interference degrees of the multiple APs in each of the multiple different WLAN topology scenarios based on the interference data; and b) adjusting the radio resources of the multiple APs in a descending order of the respective original interference degrees of the multiple APs based on each of the multiple interference threshold candidates.

In addition, the adjusting step b) may comprise:

obtaining a current interference degree of a current AP to be adjusted, wherein the current interference degree is calculated based on the interference data adjusted according to current radio resources of the multiple APs (step 1'), and reducing the current radio resource of the current AP to be adjusted in the case that the current interference degree of the current AP to be adjusted is larger than a current interference threshold candidate (step 2').

The above exemplary steps used in the adjustment may be performed repeatedly on all of the APs in each one of the multiple different WLAN topology scenarios.

In an embodiment, step (1') and step (2') may be repeated until the current interference degree of every AP in the current WLAN topology scenario is not larger than the current interference threshold candidate, as described for step (1) and step (2). In an example of adjusting bandwidths as the radio resources, since the current interference degree of a certain AP in the current WLAN topology scenario may still be larger than the current interference threshold candidate after the first round of bandwidth reduction of the APs, step (1') and step (2') may be repeated for more than one round of bandwidth reduction of the APs, for example, in the first round for bandwidth reduction from 160 MHz to 80 MHz, then in the second round for bandwidth reduction from 80 MHz to 40 MHz.

In another example, step (1') and step (2') may be repeated only for one round of bandwidth reduction of the APs, for example, for bandwidth reduction from 160 MHz to 80 MHz. Then, the network quality of the current WLAN topology scenario may be determined after one round of bandwidth reduction. Accordingly, the interference threshold may be determined based on the network qualities of the multiple WLAN topology scenarios each with one round of bandwidth reduction. The determined interference threshold may be used for the APs with the same bandwidth to be adjusted. Method 300 may be performed multiple times to obtain multiple interference thresholds respectively for multiple bandwidths.

After the radio resources of the APs of the current WLAN topology scenario are adjusted, the network quality of the current WLAN topology scenario may be determined as an evaluation of the performance of the current WLAN, which can be further used to determine the interference threshold.

At Step 304, the controller may determine a network quality of each of the multiple different WLAN topology scenarios adjusted based on each of the multiple interference threshold candidates. According to Step 304, for each WLAN topology scenario, a group of multiple network qualities may be determined based on the multiple interference threshold candidates, and then multiple groups of network qualities may be determined for the multiple different WLAN topology scenarios.

At Step 305, the controller may determine the interference threshold according to network qualities of all the multiple different WLAN topology scenarios adjusted based on all the multiple interference threshold candidates. In other words, the interference threshold may be determined based on the above multiple groups of network qualities. For example, the interference threshold may be determined such that network qualities of multiple predetermined different WLAN topology scenarios out of the multiple different WLAN topology scenarios increase after adjusting the radio resources of the multiple APs of the multiple predetermined different WLAN topology scenarios with the interference threshold. The network quality of a WLAN may refer to any suitable network quality parameter, such as throughput, latency, loss of packets, and/or ratio of error packets of the WLAN.

Optionally, as shown at Step 302, before calculating the respective original interference degrees of the multiple APs based on the interference data, the controller may process the interference data by filling and/or filtering. Step 302 is similar to Step 202, and the descriptions with respect to Step 202 also applies to Step 302.

The determined interference threshold may be any of the threshold candidates, or may also be any value chosen from the intervals formed by the threshold candidates.

The operations depicted by FIGS. 2-3 may be performed by a controller controlling the APs, which may be located within any one or more APs, or independent of the APs. The controller may be any type of computing device.

Figure 4:
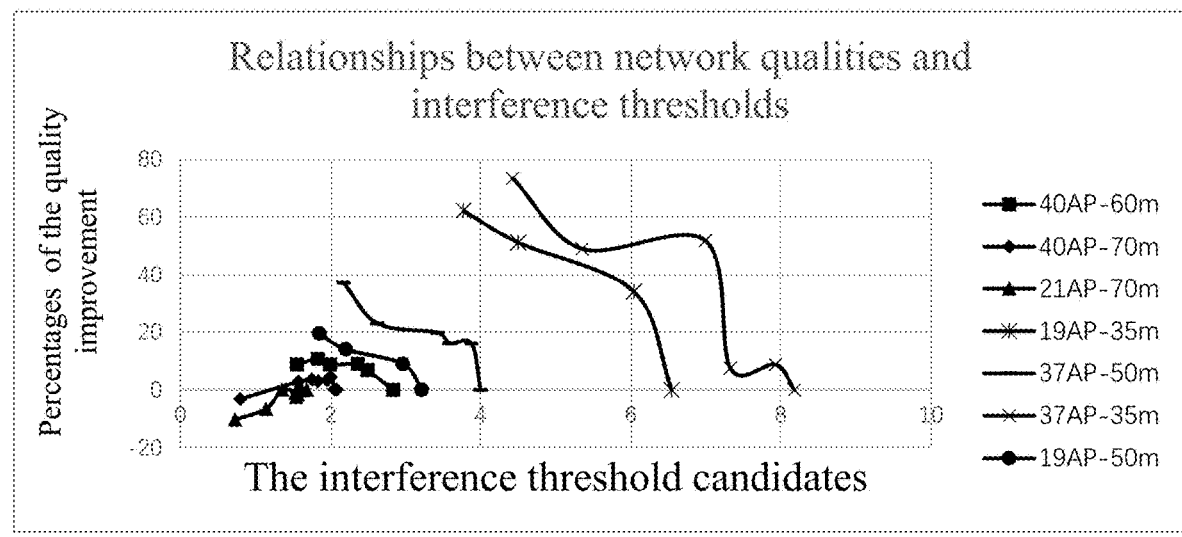
FIG. 4 shows an exemplary graph illustrating relationships between network qualities and interference thresholds for arranging radio resources of multiple different WLAN topology scenarios according to an embodiment of the present disclosure.

FIG. 4 shows an exemplary graph illustrating relationships between network qualities and interference thresholds for arranging bandwidths of multiple different WLAN topology scenarios according to an embodiment of the present disclosure.

Referring to FIG. 4, the vertical axis represents the network qualities, which are expressed by the percentages of the quality improvement with the bandwidth adjustment with respect to the network quality without the bandwidth adjustment, and the abscissa axis represents the interference threshold candidates. After Steps 301-304 are performed according to an embodiment of the present disclosure, for each WLAN topology scenario, a group of multiple network qualities may be determined based on multiple interference threshold candidates, and multiple groups of network qualities may be determined for the multiple different WLAN topology scenarios. Each group of network qualities in FIG. 4 is connected by a curve, and the number of curves corresponds to the number of the WLAN typology scenarios. In FIG. 4, 7 curves corresponding to 7 different WLAN typology scenarios are shown. The network quality here is represented by a sum of the throughputs of the multiple APs. The network quality is not limited to throughputs and may be other measurements, such as latency, loss of packets, the ratio of error packets, and so on. As shown in FIG. 4, when the interference threshold candidate is smaller than around 1.6, the qualities of some of the WLAN typology scenarios are decreased, and when the interference threshold candidate is larger than around 2.0, the quality improvements of some of the WLAN typology scenarios begin to decrease to zero. Therefore, the interference threshold may be determined to be a number in the range of 1.6 to 2.0, for example, 1.8, such that the network qualities of almost all of the WLAN typology scenarios get improved with this interference threshold.

Figure 5:
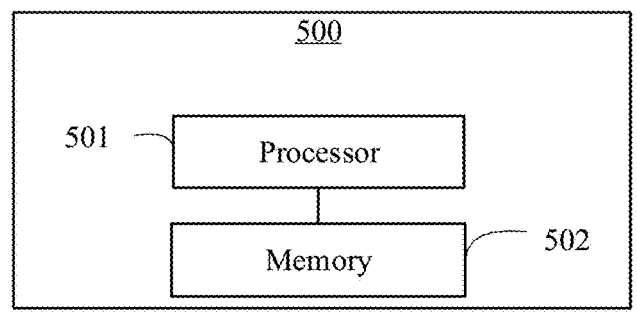
FIG. 5 is an exemplary block diagram illustrating a computing device according to an embodiment of the present disclosure.

FIG. 5 is an exemplary block diagram illustrating a computing device according to an embodiment of the present disclosure. It should be noted that the computing device depicted in FIG. 5 may be a controller described in the above and can be used to perform the operations of radio resource management of the multiple APs in WLAN, for example, respective methods as described in FIGS. 2-3.

As shown in FIG. 5, the computing device 500 can comprise processor 501 and memory 502. The processor 501 is communicatively coupled with the memory and configured to perform the methods discussed above.

Examples of processor 501 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processor 501 can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 502.

The memory 502 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory 502 may reside in the processor 501, external to the processor 501, or distributed across multiple entities including the processor 501. The memory 502 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

In addition, according to another embodiment of the present disclosure, a controller for radio resource management of a WLAN with multiple access points (APs) to realize one or more of the above-described procedures is disclosed, and details are omitted herein for conciseness. The controller may also determine an interference threshold for radio resource management of a WLAN with multiple different WLAN topology scenarios, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Expression such as "according to", "based on", "dependent on", and so on as used in the disclosure does not mean "according only to", "based only on", or "dependent only on", unless it is explicitly otherwise stated. In other words, such expression generally means "according at least to", "based at least on", or "dependent at least on" in the disclosure.

Any reference in the disclosure to an element using the designation "first", "second" and so forth is not intended to comprehensively limit the number or order of such elements. These expressions can be used in the disclosure as a convenient method for distinguishing two or more units. Thus, a reference to a first unit and a second unit does not imply that only two units can be employed or that the first unit must precede the second unit in some form.

The term "determining" used in the disclosure can include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions can be regarded as "determining".

The terms such as "connected", "coupled" or any of their variants used in the disclosure refer to any connection or combination, direct or indirect, between two or more units, which can include the following situations: between two units that are "connected" or "coupled" with each other, there are one or more intermediate units. The coupling or connection between the units can be physical or logical, or can also be a combination of the two. As used in the disclosure, two units can be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including ", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure can be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for radio resource management of a wireless local area network (WLAN) with multiple access points (APs), comprising:
    acquiring interference data of the multiple APs;
    calculating respective original interference degrees of the multiple APs based on the interference data; and
    adjusting radio resources of the multiple APs in a descending order of the respective original interference degrees of the multiple APs, comprising:
        step (1): obtaining a current interference degree of a current AP to be adjusted, wherein the current interference degree is calculated based on the interference data adjusted according to current radio resources of the multiple APs;
        step (2): reducing the current radio resources of the current AP to be adjusted in response to the current interference degree of the current AP to be adjusted is larger than an interference threshold; and
    repeating step (1) and step (2) until the current interference degree of every AP is not larger than the interference threshold;
    wherein the interference threshold is predetermined such that network qualities of multiple predetermined different WLAN topology scenarios increase after adjusting the radio resources of multiple APs in each of the multiple predetermined different WLAN topology scenarios with the interference threshold.

2. The method of claim 1, wherein the interference threshold is predetermined by:
    acquiring interference data of multiple APs in each of multiple different WLAN topology scenarios including the multiple predetermined different WLAN topology scenarios;
    adjusting the radio resources of the multiple APs in each of the multiple different WLAN topology scenarios based on the interference data and each of multiple interference threshold candidates;
    determining a network quality of each of the multiple different WLAN topology scenarios adjusted based on each of the multiple interference threshold candidates; and
    determining the interference threshold according to network qualities of all of the multiple predetermined different WLAN topology scenarios adjusted based on all of the multiple interference threshold candidates.

3. The method of claim 2, wherein the radio resources of the multiple APs in each of the multiple predetermined different WLAN topology scenarios are adjusted in a descending order of the original interference degrees of the multiple APs, which are calculated based on the interference data of the multiple APs.

4. The method of claim 2, wherein adjusting the radio resources of the multiple APs in each of the multiple predetermined different WLAN topology scenarios based on the acquired interference data and each of the multiple interference threshold candidates comprises:
    calculating respective original interference degrees of the multiple APs in each of the multiple different WLAN topology scenarios based on the interference data;
    adjusting the radio resources of the multiple APs in a descending order of the respective original interference degrees of the multiple APs based on each of the multiple interference threshold candidates, comprising:
        obtaining a current interference degree of a current AP to be adjusted, wherein the current interference degree is calculated based on the interference data adjusted according to current radio resources of the multiple APs, and
        reducing the current radio resource of the current AP to be adjusted in response to the current interference degree of the current AP to be adjusted is larger than a current interference threshold candidate.

5. The method of claim 1, wherein
    the interference data comprises a first interference part from APs within the WLAN, a second interference part from APs outside the WLAN and a third interference part from non-AP interference sources; and
    the first interference part, the second interference part and the third interference part are assigned different weights when calculating an original interference degree and a current interference degree.

6. The method of claim 1, further comprising: before calculating the respective original interference degrees of the multiple APs based on the interference data, processing the interference data by filling and/or filtering.

7. The method of claim 1, wherein adjusting the radio resources of the multiple APs comprises turning off one or more of the multiple APs.

8. The method of claim 1, wherein adjusting the radio resources of the multiple APs comprises reducing the bandwidths of one or more of the multiple APs step by step.

9. A method for determining an interference threshold for radio resource management of a wireless local area network (WLAN) with multiple different WLAN topology scenarios, comprising:
    acquiring interference data of multiple access points (APs) in each of the multiple different WLAN topology scenarios;
    adjusting radio resources of the multiple APs in each of the multiple different WLAN topology scenarios based on the interference data and each of multiple interference threshold candidates;
    determining a network quality of each of the multiple different WLAN topology scenarios adjusted based on each of the multiple interference threshold candidates; and
    determining the interference threshold according to network qualities of all of the multiple different WLAN topology scenarios adjusted based on all of the multiple interference threshold candidates,
    wherein the interference threshold is determined such that network qualities of multiple predetermined different WLAN topology scenarios out of the multiple different WLAN topology scenarios increase after adjusting the radio resources of the multiple APs of the multiple predetermined different WLAN topology scenarios with the interference threshold.

10. The method of claim 9, wherein the radio resources of the multiple APs in each of the multiple different WLAN topology scenarios are adjusted in a descending order of interference degrees of the multiple APs, which are calculated based on the interference data of the multiple APs.

11. The method of claim 9, wherein adjusting the radio resources of the multiple APs in each of the multiple different WLAN topology scenarios based on the interference data and each of multiple interference threshold candidates comprises:
    calculating respective original interference degrees of the multiple APs in each of the multiple different WLAN topology scenarios based on the interference data; and
    adjusting the radio resources of the multiple APs in a descending order of the respective original interference degrees of the multiple APs based on each of the multiple interference threshold candidates, comprising:

step (1'): obtaining a current interference degree of a current AP to be adjusted, wherein the current interference degree is calculated based on the interference data adjusted according to current radio resources of the multiple APs, and step (2'): reducing the current radio resource of the current AP to be adjusted in the case that the current interference degree of the current AP to be adjusted is larger than a current interference threshold candidate.

12. The method of claim 11, wherein step (1') and step (2') are repeated for each WLAN topology scenario until the current interference degree of every AP in the current WLAN topology scenario is not larger than the current interference threshold candidate.

13. A controller for radio resource management of a wireless local area network (WLAN) with multiple access points (APs), comprising:

one or more processors;

a memory coupled to at least one of the one or more processors; and a set of computer program instructions stored in the memory, which, when executed by at least one of the one or more processors, perform actions of:

acquiring interference data of the multiple APs;

calculating respective original interference degrees of the multiple APs based on the interference data; and adjusting radio resources of the multiple APs in a descending order of the respective original interference degrees of the multiple APs, comprising:

step (1): obtaining a current interference degree of a current AP to be adjusted, wherein the current interference degree is calculated based on the interference data adjusted according to current radio resources of the multiple APs, step (2): reducing the current radio resources of the current AP to be adjusted in response to the current interference degree of the current AP to be adjusted is larger than an interference threshold, and repeating step (1) and step (2) until the current interference degree of every AP is not larger than the interference threshold, wherein the interference threshold is predetermined such that network qualities of multiple predetermined different WLAN topology scenarios increase after adjusting radio resources of multiple APs in each of the multiple predetermined different WLAN topology scenarios with the interference threshold.

14. The controller of claim 13, wherein the interference threshold is predetermined by:

acquiring interference data of multiple APs in each of multiple different WLAN topology scenarios including the multiple predetermined different WLAN topology scenarios;

adjusting the radio resources of the multiple APs in each of the multiple different WLAN topology scenarios based on the interference data and each of multiple interference threshold candidates;

determining a network quality of each of the multiple different WLAN topology scenarios adjusted based on each of the multiple interference threshold candidates; and determining the interference threshold according to network qualities of all of the multiple different WLAN topology scenarios adjusted based on all of the multiple interference threshold candidates.

15. The controller of claim 14, wherein adjusting the radio resources of the multiple APs in each of the multiple different WLAN topology scenarios based on the interference data and each of the multiple interference threshold candidates comprises:

calculating respective original interference degrees of the multiple APs in each of the multiple different WLAN topology scenarios based on the interference data;

adjusting the radio resources of the multiple APs in a descending order of the respective original interference degrees of the multiple APs based on each of the multiple interference threshold candidates, comprising:

obtaining a current interference degree of a current AP to be adjusted, wherein the current interference degree is calculated based on the interference data adjusted according to current radio resources of the multiple APs, and reducing the current radio resource of the current AP to be adjusted in response to the current interference degree of the current AP to be adjusted is larger than a current interference threshold candidate.

* * * * *